United States Patent [19]

Heynacher et al.

[11] Patent Number: 4,538,911
[45] Date of Patent: Sep. 3, 1985

[54] THREE-DIMENSIONAL INTERFEROMETRIC LENGTH-MEASURING APPARATUS

[75] Inventors: Erich Heynacher; Reinhard Ludewig, both of Heidenheim, Fed. Rep. of Germany

[73] Assignee: Carl-Zeiss-Stiftung, Heidenheim, Fed. Rep. of Germany

[21] Appl. No.: 457,673

[22] Filed: Jan. 13, 1983

[30] Foreign Application Priority Data

Jan. 15, 1982 [DE]  Fed. Rep. of Germany ....... 3201007
Aug. 26, 1982 [DE]  Fed. Rep. of Germany ....... 3231719

[51] Int. Cl.³ ............................................. G01B 9/02
[52] U.S. Cl. .................................... 356/358; 356/363
[58] Field of Search ................................ 356/358, 363

[56] References Cited

U.S. PATENT DOCUMENTS

| | | | |
|---|---|---|---|
| 3,661,463 | 5/1972 | Brainard et al. | 356/358 |
| 3,692,413 | 9/1972 | Marcy et al. | 356/363 X |
| 3,796,494 | 3/1974 | Takabayashi | 356/358 |
| 3,884,580 | 5/1975 | Webster et al. | 356/358 |
| 4,043,671 | 8/1977 | Goodwin | 356/358 |
| 4,153,370 | 5/1979 | Corey, III | 356/358 |
| 4,261,107 | 4/1981 | Coleman et al. | 356/358 X |
| 4,365,301 | 12/1982 | Arnold et al. | 356/358 X |

FOREIGN PATENT DOCUMENTS

1381287  1/1975  United Kingdom .
1450692  9/1976  United Kingdom .

Primary Examiner—Davis L. Willis
Assistant Examiner—Matthew W. Koren
Attorney, Agent, or Firm—Hopgood, Calimafde, Kalil, Blaustein & Judlowe

[57] ABSTRACT

The invention relates to a three-dimensional length-measuring device which employs optical interferometry and in which the comparator principle is satisfied as excellently as possible with respect to all three axes. For this purpose, a workpiece holder which is displaceable in orthogonal horizontal directions carries a three-dimensional reflecting body which defines a measurement space and is in the form of three mutually perpendicular adjacent mirrors (triple mirrors). Extensions of measurement beams with which the three-dimensional reflecting body is measured intersect at a point only slightly offset from the workpiece holder, and to obtain high thermal stability, the measurement table and the housing of the measuring device are made of a material of low thermal expansion. In order to determine each coordinate of the position of a movable probe pin with interferometric precision of measurement, a first one of the individual beams of a double-beam flat-mirror interferometer is provided for each coordinate and is directed via a triple prism fixed with respect to the probe-pin holder. The other individual beam of the interferometer is in each case used to directly measure the opposing mirror of the three-dimensional body connected with the workpiece. Interferometer heads themselves are fixedly mounted on the machine. The probe-pin holder which in terms of the optical system need only carry the triple prisms, therefore is of very low weight.

22 Claims, 10 Drawing Figures

THREE-DIMENSIONAL INTERFEROMETRIC LENGTH-MEASURING APPARATUS

BACKGROUND OF THE INVENTION

The present invention relates to a three-dimensional interferometric length-measuring device in which the three dimensions of workpieces or test pieces can be determined with a high degree of accuracy.

In particular, in the production of imaging systems for response to radiation of extremely short wavelength, for example, reflectors used in x-ray astronomy, a measuring device is required which will permit three-dimensional measurements of a precision which is up to about two orders of magnitude better than can be achieved with traditional multiple-coordinate measuring machines. A measuring device which is suitable for use for this purpose must incorporate interferometric length-measuring systems, in order to be able to achieve the required resolution, typically 10 nm.

Present interferometric measuring devices which measure in three coordinates are of generally the construction known from multiple-coordinate measuring machines wherein measuring systems are disposed on the guides of the machine. One such measuring device is described in West German Pat. No. 2,109,954. In that case, the position of a work table, which is movable in three directions in space relative to a machining head, is determined by means of a single laser beam which undergoes multiple reflection along the guides of movable components of the device. In this arrangement, there is a considerable violation of the comparative principle with respect to all three measurement axes. Errors in the guides of the measuring device therefore limit the theoretically achievable precision of interferometric measurement. West German Pat. No. 2,159,134, West German Pat. No. 2,164,898 and West German published application No. OS 2,441,984, disclose comparators having interferometric measurement systems in two coordinate directions. However, said patents do not contain any suggestion as to the arrangement of an interferometer system for the additional third coordinate direction.

BRIEF STATEMENT OF THE INVENTION

The object of the present invention is so to develop a measuring device of the aforementioned type that it will provide high measurement precision in three axes and that it will be as far as possible unaffected by guide errors.

In a preferred form, the invention achieves the foregoing object in an instrument in which plural double-beam flat-mirror interferometers are fixedly mounted, each of them being dedicated to operation on a different one of three mutually perpendicular axes which converge upon the region of support for a test object or workpiece to be measured. The test object or workpiece is supported for two-coordinate motion in a horizontal plane, and a three-dimensional reflecting body, fixed to the workpiece support, positions its three mutually perpendicular reflecting surfaces (mirrors) for direct-reflecting coaction with the respective interferometers. The areas of the mirrors of the reflecting body are such as to define a three-dimensional working zone or measurement space within which coordinate values of points on the test object or workpiece can be determined with relatively great precision.

By constructing an interferometric measuring device in accordance with the invention it is possible to obtain a very stable and compact overall construction while substantially complying with the comparator principle in all three coordinates, so that guide errors have practically no effect on the achievable precision of measurement.

The mirrors of the three-dimensional reflecting body are preferably made of a material having low thermal expansion so as to minimize thermal effects on the precision of measurement. For reasons of stability, it is preferred that they be connected to each other and form a measurement chamber in the manner of a triple mirror, wherein one of the mirrors is the bottom of the work-supporting means.

If the work-contacting probe is fastened rigidly to the measuring device, the speed of measurement is limited, since in the course of work-contacting, the relatively large masses of displaceable components must be guided accurately, if collisions are to be avoided with the workpiece, test specimen or other object to be measured.

Now, it is known to provide measurement machines with probes wherein a resiliently supported probe pin is deflected in the contacting process and wherein means are provided for determining the deflection, so that suitable correction can be made in coordinate values determined by measurement systems of the machine. These known probes, however, have measurement-value transmitters in the form of inductive-measurement systems and the like which cannot compete with interferometric-measurement systems, in respect of achievable precision of measurement.

It is therefore advisable to provide the length-measuring device with a probe-pin holder which is of as light weight as possible and which is included in the interferometric system of the measuring device. This is achieved by providing that at least one of the coordinate systems of interferometric-beam measurement comprises two individual beams, that one of the two individual beams is directed via a mirror system which reverses its direction, that the mirror is mounted to the probe-pin holder, and that the probe-pin holder is supported movably in at least one coordinate with respect to the length-measuring device.

The advantage of this solution resides in high precision of measurement, obtainable at low expense, due to the fact that the position of the probe-pin holder is directly determined with respect to the reference mirror, which is connected with the object being measured. In measuring the position of the probe-pin holder, no additional interferometer is necessary, in that one of the two individual beams of an ordinary commercial double-beam flat-mirror interferometer may be used, as described in West German Pat. No. 2,348,272; specifically, the one of said two beams may be directed via a reflection prism fastened to the probe, while the other individual beam is directed directly from the measuring device to the reference mirror. In this way, movements of the measuring device relative to the object being measured, and movements of the probe relative to the measuring device, are simultaneously determined in magnitude and direction by a single interferometer system before the formation of an optoelectronic signal.

Since the reflection prism or other mirror system is the only optical part which must be supported by the probe-pin holder, the mass of this part which tracks the contour of the test piece can be very small, as compared with traditional measurement systems in which the probe part must carry the complete optical system of the interferometer head.

The mirror system which is probe-mounted may advisedly be a so-called triple prism, having low sensitivity to adjustment.

It is advantageous to provide the probe-pin holder with three separate mirror systems which serve as reflectors for three measurement beams guided in the manner of a Cartesian coordinate system, in order to determine the movement of the probe-pin holder in all three directions in space. This is advantageous even if the probe-pin holder is not mounted for displacement in all three directions in space, since offset of the probe-pin holder caused by guide errors can also be determined.

As a rule, the probe includes a ball for mechanical contact with the object to be measured. It is advisable to replaceably mount the probe pin on its holder, to permit the ball on the probe holder to be replaced by a contactless (e.g., optical) probe device, or by a testing or adjusting instrument, or possibly by a microscope, should this appear advisable in measuring the target object.

DETAILED DESCRIPTION

The invention will be described in detail for several embodiments, in conjunction with the accompanying drawings, in which.

Figure 1:
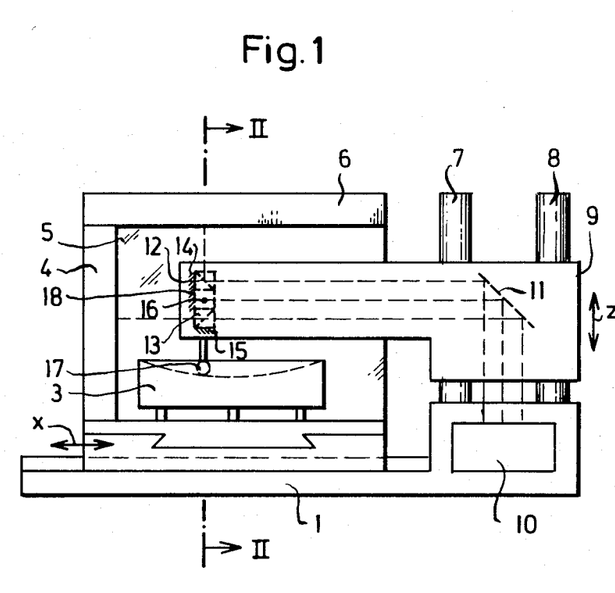
FIG. 1 is a side view of a first embodiment of the invention.
Figure 2:
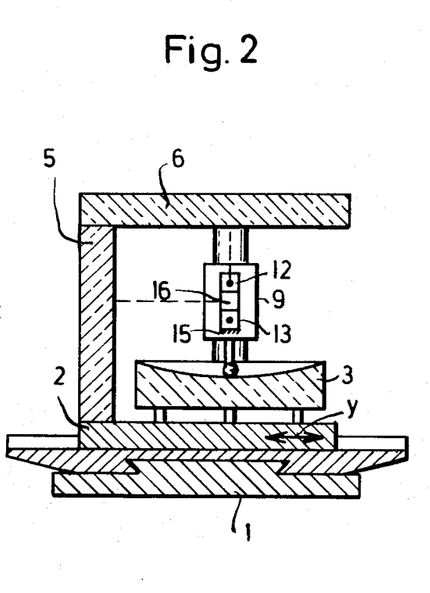
FIG. 2 is a sectional view along the line II—II of FIG. 1.

The measuring device shown in FIGS. 1 and 2 has a base plate 1 on which a table 2 is mounted for displacement via a compound slide, in the coordinate directions x and y. The table 2 supports the workpiece, shown as a concave mirror 3, and it also supports a three-dimensional reflecting body, provided by three mirrors 4, 5 and 6, to establish three sides of a measurement zone above table 2.

A measurement arm 9 is guided for vertical displacement via two columns 7 and 8 anchored to the base 1, and the outer end of arm 9 extends into the measurement zone and carries a probe 17.

Above the probe 17 and within arm 9 are three interferometer measurement heads, each of which consists of a semi-transmitting mirror (12, 13 or 16) and a reference mirror (14, 15 or 18, respectively). The measurement heads and opposing mirrors of the three-dimensional reflecting body establish three interferometric measurement paths, all of which are served, via a mirror 11, with radiation from a laser unit 10 mounted in base 1.

For the interferometers which measure in a horizontal direction, the comparator error is very slight, since z-offset is small, as between measurement beams in the x and y axes and the ball of probe 17. For measurements along the z axis, the comparator principle is strictly satisfied so that measurement errors of the first order resulting from tilt of the measurement arm 9 about the y axis (the y axis being perpendicular to the plane of FIG. 1) do not enter into the precision of measurement of a z-coordinate value.

Figure 3:
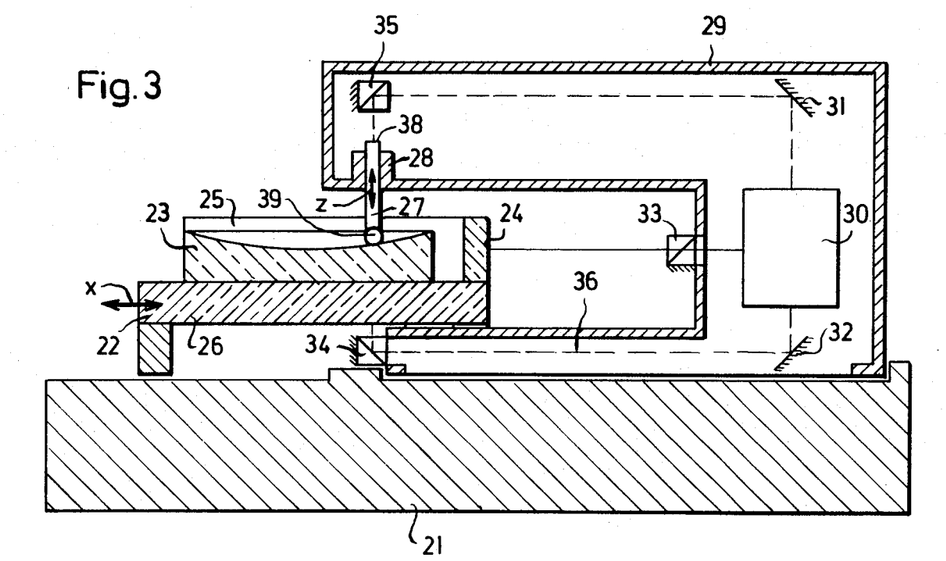
FIG. 3 is a sectional view through a second embodiment, taken for the aspect direction of FIG. 1.
Figure 4:
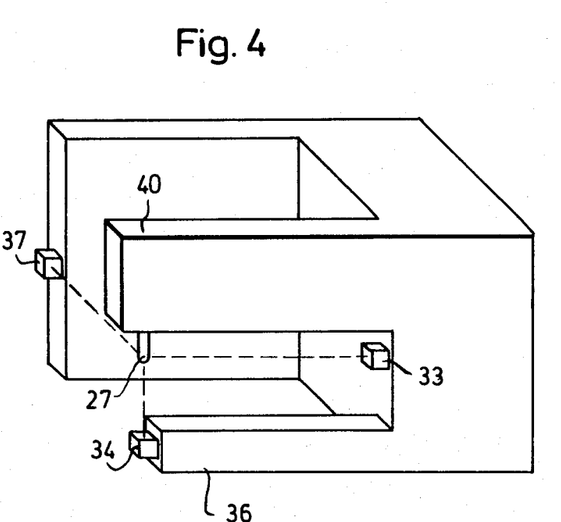
FIG. 4 is a perspective view of the housing 29 of FIG. 3.

The measuring device shown in FIGS. 3 and 4 has a base 21, as of granite, on which a table 22 is placed over air bearings and is guided in two directions. The guides of the table have not been shown. A housing 29 which carries the measuring device is also placed over air bearings on the base 21 but is fixed in position.

As shown in FIG. 4, housing 29 has the shape of a block, sides of which are locally open in two quadrants, to define two extensions 36 and 40. Table 22 can be displaced between the extensions 36 and 40 of housing 29.

The bottom 26 of table 22 (FIG. 3) is mirror-finished and, in conjunction with upstanding mirrors 24 and 25 which are seated thereon, establishes a rigid three-dimensional reflecting body which is measured by three interferometer heads 33, 34 and 37. The interferometer heads are supplied by a laser unit 30 in housing 29. Housing 29, table 22, and mirrors 24 and 25 preferably consist of the same material, of low thermal expansion, such as, for instance, Zerodur or Invar.

A probe 27 is supported by housing 29, for movement in the z-axis, perpendicular to the measurement directions of the interferometers 33 and 37, and through their point of intersection. The probe end 38 opposite the probe-ball (39) end is mirror-finished and is measured by a fourth interferometer head 35.

The measurement systems 34 and 35 thus perform a difference measurement which excludes errors in measurement based on difference in height of the table 22 and housing 29.

Figure 5:
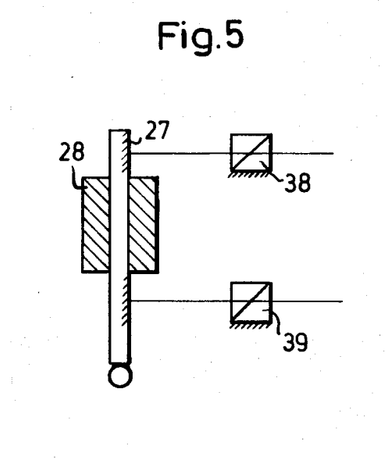
FIG. 5 is an enlarged fragmentary view of a detail to show a further development of the embodiment of FIG. 3.

Since the horizontal measurement axes are substantially aligned with the surface of the test or workpiece 23 (shown as a concave mirror), the device of FIGS. 3 and 4 satisfies the comparator principle with a very high degree of approximation, in all three coordinate directions. However, probe 27 is not rigidly connected to housing 29, so that tilting of the probe 27 can occur in its bearing 28, and such tilting has an effect on the precision of measurement in the horizontal plane (x,y). In order to be able to additionally detect such tilting, the probe 27 is provided, in the modified embodiment shown in FIG. 5, with a mirror-finished shaft which is measured in the two axes x, y perpendicular to the displacement direction z, by separate interferometer systems, only the y-sensitive one of which interferometer systems is shown in FIG. 5. The interferometer system of FIG. 5 is formed essentially by interferometer heads 38, 39 and the mirror-finished surfaces of the probe shaft 27, as the same are viewable beyond both sides of bearing 28.

It will be understood that the difference signal, as between outputs of the two interferometers 38-39 of FIG. 5, indicates tilt and that it can be used, either to eliminate the tilt by means of piezo drives (not shown) incorporated in bearing 28, or for a mathematical correction of the measurement result in the y direction.

Furthermore, the measurement result can be corrected mathematically with respect to deviations in planarity of the mirrors 24-25-26 and with respect to deviations in the perpendicular relationship of these mirrors to one another. For this purpose, the position-dependent deformations of the measurement chamber defined by the mirrors 24-25-26 may, for example, be measured once and stored, in the form of approximation functions, in the evaluation computer of the machine; thereafter, these stored functions are permanently available for correction of the corresponding measurement values.

In the embodiment of FIGS. 3 to 5, the work table is supported for movement in two orthogonal directions. It is naturally also possible for the table 22 to be fixed in position and for the housing 29 to be movable, or for these two components (22, 29) to be mounted movable to each other, each in a different one of the two orthogonal directions, without thereby limiting the usefulness of the measuring device.

Figures 6, 7:
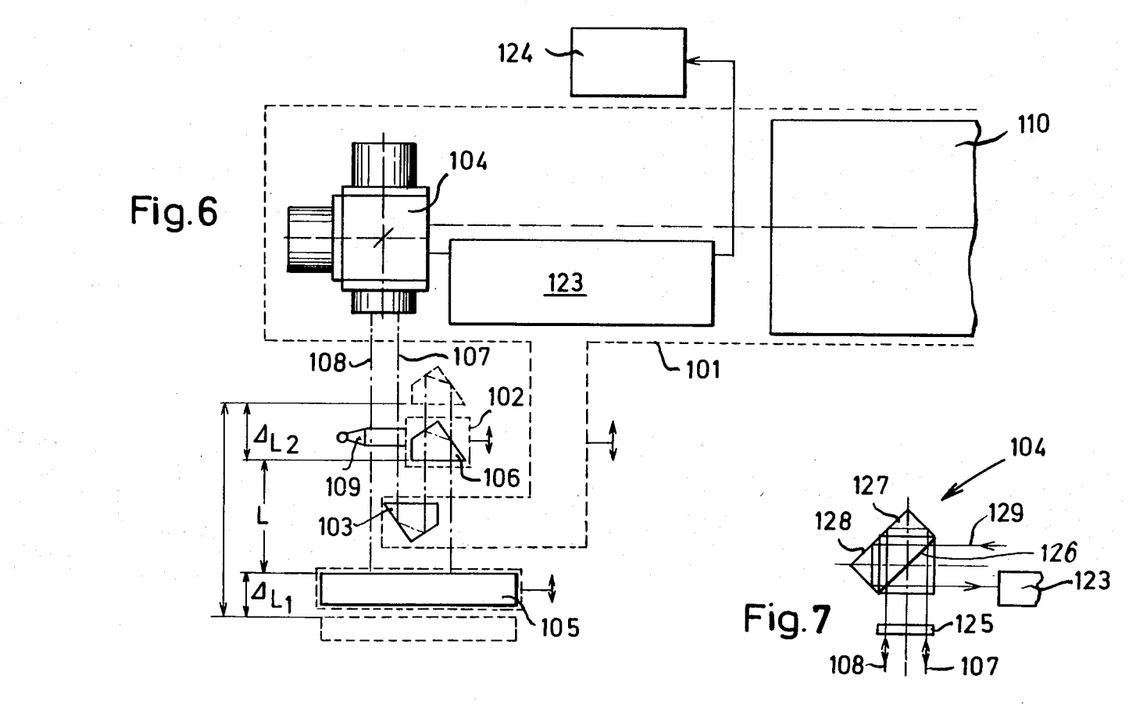
FIG. 6 is a simplified diagram, reduced to movement in one coordinate, of the probe-pin holder of a third embodiment.
FIG. 7 diagrammatically shows the optical system of the interferometer 104 of FIG. 6.

The interferometric measuring device of FIG. 6 comprises (1) a flat opposing mirror 105 which will be understood to be connected to the test piece (not shown) and (2) a measurement-head part 101 which is movable relative thereto and contains the measurement systems, i.e., substantially the interferometer optics. Part 101 corresponds to part 9 of FIGS. 1 and 2.

The interferometer optics consists of a two-mode laser generator 110, a double-beam flat-mirror interferometer 104, an optoelectronic receiver 123 and a unit 124 for the output of the measurement value.

The flat-mirror interferometer has the construction shown in FIG. 7. The beam 129 from laser 110 is incident upon a beam-splitter 126. Beam 129 consists of two components which are polarized perpendicular to each other and slightly different in frequency, and beam splitter 126 breaks beam 129 into two individual beams. In this connection, the individual beam which passes through beam splitter 126 and (after double reflection in a first prism 128) passes to receiver 123, forms the reference beam. The individual beam 107 which is reflected by beam splitter 126 impinges, after passage through a λ/4 plate 125, onto a flat mirror whose displacement is to be measured, is there reflected and can, as a result of the rotation of its polarization plane (after passing twice through the λ/4 plate), again pass through beam splitter 126 upon its return travel; after deflection by a second prism 127, it is reflected as a second measurement beam 108 onto the flat mirror and, after another polarization rotation, again reaches beam splitter 126, where it interferes with the reference beam.

A holder 102 for a probe 109 is movably suspended from part 101 of the measuring device of FIG. 6, and holder 102 is movable in the direction of the measurement beams 107 and 108, as indicated by a double-headed arrow. This holder 102 carries a triple prism 106 which for a second time deflects the measurement beam 107 reflected by a second triple prism 103 which is connected to part 101, before it strikes and is reflected back from a flat mirror 105. The second measurement beam 108 of the interferometer 104 passes directly to the flat mirror 105.

With this optical structure, each displacement $\Delta L_1$ of the flat mirror 105 (connected to the test piece) relative to the measurement head 101 results in a change of path length of the measurement branch of the interferometer 104, the change being $4 \times \Delta L_1$. Also upon deflection of the probe 109 by the amount $\Delta L_2$ shown, the path length of the measurement branch consisting of the two individual beams 107 and 108 changes by $4 \times \Delta L_2$. Assurance is thus had that displacements of the plane mirror 105, the measurement head 101 and the probe 109 are determined, in magnitude and sign, by the interferometer 104.

Figure 8:
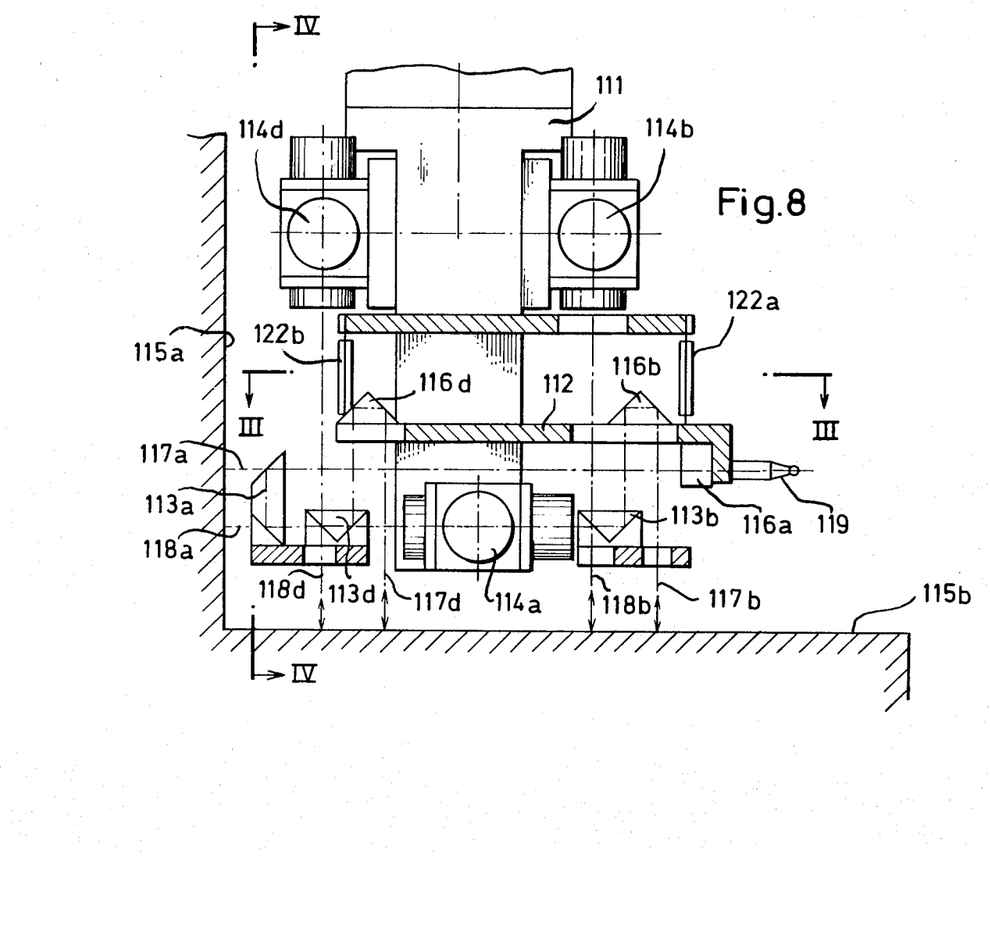
FIG. 8 is a first section through the measurement head of a fourth embodiment.
Figure 9:
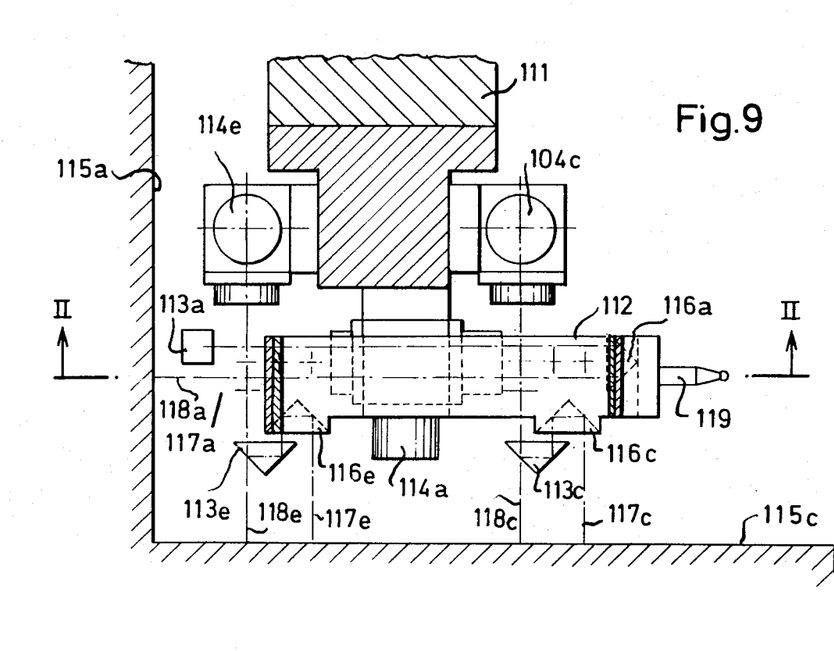
FIG. 9 is a second section through the measurement device of FIG. 8, along the line III—III of FIG. 8.
Figure 10:
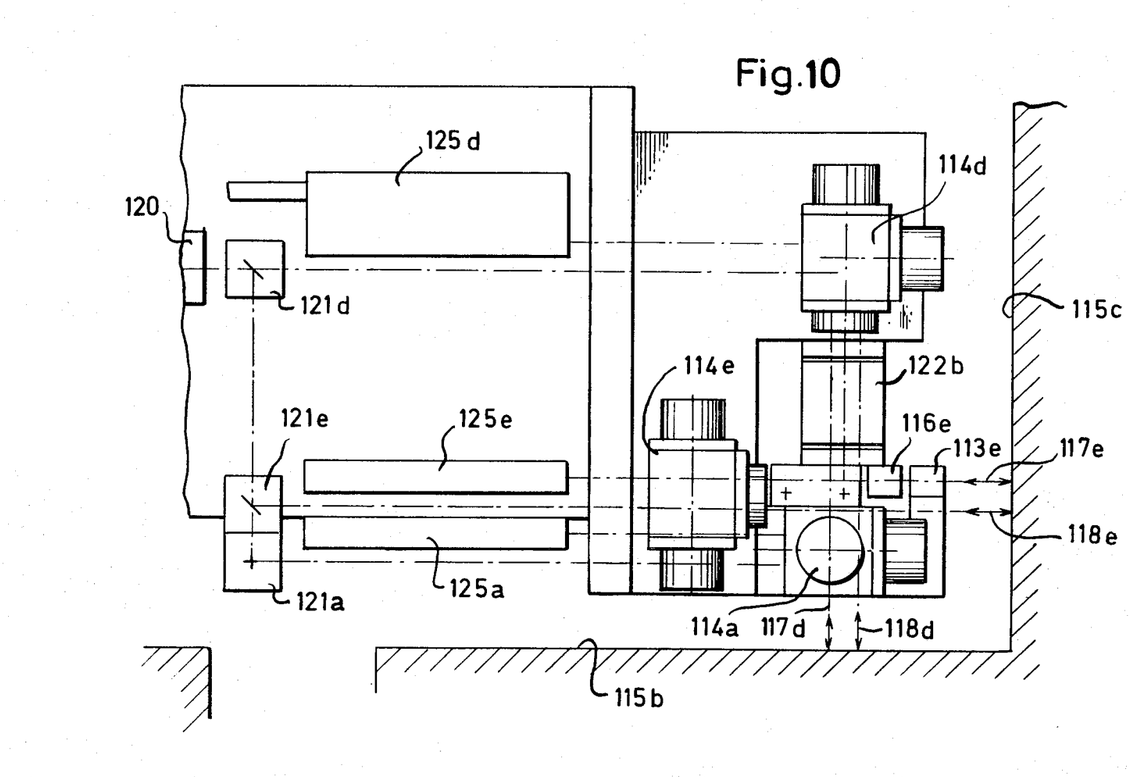
FIG. 10 is a third view of the measuring device of FIGS. 8 and 9, along the line IV—IV of FIG. 8.

FIGS. 8 to 10 show three sections through a specific and complete embodiment of the invention in a three-dimensional measuring device. It has a three-dimensional reflecting body for workpiece support, consisting of three flat individual mirrors 115a, b and c in mutually perpendicular relation to each other in the manner of a triplane mirror, the means of workpiece connection being not shown. Part 111 carries the measurement systems and is displaceable in three coordinates relative thereto. The support 112 for a probe 119 is suspended from part 111 by means of a pair of leaf springs 122a and 122b, in such manner as to be movable in the direction perpendicular to the mirror surface 115a.

The position of probe 119 in the direction of movement is detected by an interferometer 114a whose two individual beams 117a and 118a (directly, or after two deflections at prisms 113a and 116a) measure the opposing body mirror 115a.

Offset of holder 112 in the direction perpendicular to the mirror 115b, and rotation of holder 112 about an axis perpendicular to body mirror 115c, are determined by two interferometers 114b and 114d which are in spaced parallel relation. Their individual beams 117b and 117d are directed via the holder 112 of probe pin 119, correspondingly folded, in each case, by two prisms 113b/116b and 113d/116d, while the body mirror 115b is again directly measured via the other individual beams 118b and 118d of interferometers 114b and 114d.

Finally, and as can be noted from the sectional view of FIG. 9, the measurement device has two further interferometers 114c and 114e, which detect the offset of the probe in the direction perpendicular to body-mirror surface 115c and swinging movements of carriage 112 about an axis perpendicular to mirror surface 115b. Spaced corresponding prisms for folding and directing the beam are designated 113c/113e and 116c/116e, respectively.

Aside from rotation of holder 112 about the axis of probe pin 119 (which has no effect on measurement of the test piece), all degrees of freedom of movement between the workpiece-related body mirrors 115 (a,b,c) and the measuring device 111 are determined, using the indicated five interferometers of the embodiment of FIGS. 8 to 10. These five interferometers are supplied by a beam-splitter system 121 from a common laser 120. Furthermore, each interferometer 114 has associated with it an optoelectronic receiver 125, of which only the units 125a, 125d and 125e are visible in FIG. 10.

We claim:

1. A three-dimensional work-measuring instrument for measuring within a volume defined by a measurement range for each of three orthogonally related directional components, said instrument comprising a work holder and a housing carrying elements of a three-dimensional interferometric displacement-measuring system, said work holder and housing being movable with respect to each other, said elements producing orthogonally related interferometric measurement beams in the three component directions to be measured, a rigid three-dimensional reflecting body secured to the work holder, said body comprising three mirrors in mutually perpendicular relation, each of said mirrors being of area spanning the entire measurement range of a different two of the coordinate directions and oriented to serve as a reflector for a different one of the three interferometric measurement beams.

2. A three-dimensional work-measuring instrument for measuring within a volume defined by a measurement range for each of three orthogonally related directional components, said instrument comprising a work holder and a housing carrying elements of a three-dimensional interferometric displacement-measuring system, said work holder and housing being movable with respect to each other, said elements producing orthogonally related interferometric measurement beams in the three component directions to be measured, a rigid three-dimensional reflecting body secured to the work holder, said body comprising three mirrors in mutually perpendicular relation, each of said three mirrors being oriented to serve as a reflector for a different one of the three interferometric measurement beams, each one of two of said mirrors extending over the measurement range for a different one of two coordinates while the third one of said mirrors extends over the measurement ranges of said two coordinate directions, a work-contact probe guided by said housing for displacement in the third coordinate direction, and a mirror carried by said probe within said housing, said elements including means within said housing for making an interferometric difference measurement of the third-coordinate distance between the position of the probe and said third mirror.

3. A three-dimensional work-measuring instrument for measuring within a volume defined by a measurement range for each of three orthogonally related directional components, said instrument comprising a work holder and a housing carrying elements of a three-dimensional interferometric displacement-measuring system, said work holder and housing being movable with respect to each other, said elements producing orthogonally related interferometric measurement beams in the three component directions to be measured, a rigid three-dimensional reflecting body secured to the work holder, said body comprising three mirrors in mutually perpendicular relation, each of said three mirrors being oriented to serve as a reflector for a different one of the three interferometric measurement beams, each one of two of said mirrors extending over the measurement range for a different one of two coordinates while the third one of said mirrors extends over the measurement ranges of said two coordinate directions, a probe-pin holder supported for movement with respect to said housing in at least one of said coordinate directions, at least one of the interferometric measurement beams consisting of two individual beams (107–108), and a mirror system carried by said probe-pin holder and oriented in the path of one of said two individual beams for reversing the direction thereof.

4. A measuring device according to claim 1, characterized by the fact that the measurement beams extend from a measurement head and all three of said mirrors are reflecting in the direction of said head.

5. A measuring device according to claim 2, characterized by the fact that the probe (27) has a rectangularly shaped, mirrored shaft which is measured by two spaced interferometric bundles of rays.

6. A measuring device according to claim 2, characterized by the fact that said two coordinate directions define a horizontal plane of work-holder displaceability, and that a downwardly facing mirror on the underside of said work holder spans the entire measurement range of each of said two coordinate directions.

7. A measuring device according to claim 1, characterized by the fact that said work holder and said three-dimensional reflecting body are made of the same material of low thermal expansion.

8. A measuring device according to claim 1, characterized by the fact that said housing includes a probe-pin holder, and by the fact that at least one of the interferometric measurement beams consists of two individual beams (107, 108; 117, 118) and that one of said two individual beams (107; 117) is conducted over a mirror system (prism 106; 116) which reverses its direction, said mirror system being carried by the probe-pin holder (102; 112), and said probe-pin holder being supported for movement with respect to said housing in at least one coordinate direction.

9. A measuring device according to claim 8 or claim 3, characterized by the fact that the two individual beams (107, 108) are emitted by a known double-beam plane-mirror interferometer (104).

10. A measuring device according to claim 8 or claim 3, characterized by the fact that the mirror system is a triple prism (106, 116).

11. A measuring device according to claim 8 or claim 3, characterized by the fact that the mirror system (triple prism 106, 116) which is carried by the probe-pin holder (102) is arranged between the opposing mirror (105; 115a, b, c) and another mirror system (103; 113) which is carried by said housing and reversed the direction of the measurement beam (107; 117).

12. A measuring device according to claim 8 or claim 3, characterized by the fact that the probe-pin holder (112) carries at least three separate mirror systems (116a, b, c) which serve as reflectors for three interferometric measurement beams (117a, b, c) guided along the axes of a Cartesian-coordinate system.

13. A measuring device according to claim 8 or claim 3, characterized by the fact that the probe-pin holder (112) carries mirror systems (116b, d; c, e) which are arranged in spaced relation from each other in at least one coordinate direction and over which two measurement beams (117b, d; c, e) which are parallel to each other are guided.

14. A measuring device according to claim 1 or claim 2 or claim 3, characterized by a beam-splitter system (121) which removes the individual beams for the different interferometric measurement systems (114a–e) from the output beam of a laser generator (110; 120).

15. A measuring device according to claim 8 or claim 3, characterized by the fact that the probe-pin holder (112) is suspended by means of leaf springs (122a, b) from the part (111) of the measuring device which carries the interferometers.

16. A measuring device according to claim 8 or claim 3, characterized by the fact that the probe-pin holder (102; 112) carries a work-contacting probe (109; 119).

17. A measuring device according to claim 8 or claim 3, characterized by the fact that the probe-pin holder (102; 112) carries a testing or adjusting device.

18. The work-measuring instrument of claim 1, wherein three orthogonally related guides determine relative movement of said work holder and housing in the respective directions of said three coordinates.

19. The work-measuring instrument of claim 1, and including a work-contact probe fixedly carried by said housing.

20. The work-measuring instrument of claim 1, wherein said work holder comprises a base with a two-axis compound slide to enable workpiece displacement in two of said three coordinate directions, and guide means upstanding from said base for third-coordinate guidance of housing displacement with respect to said work holder.

21. The work-measuring instrument of claim 2, wherein a massive base having an upper surface extending in said first two coordinate directions provides independent air-bearing support for said work holder and for said housing, and independent guide means coacting between said base and said work holder and between said base and said housing for limiting work-holder displacement to one of said two component directions and housing displacement to the other of said component directions.

22. A measuring device according to claim 2, characterized by the fact that said work holder and said three-dimensional reflecting body are made of the same material of low thermal expansion.

* * * * *